Nov. 7, 1950 — J. R. COFFING — 2,528,742
PET FEEDER
Filed June 17, 1949
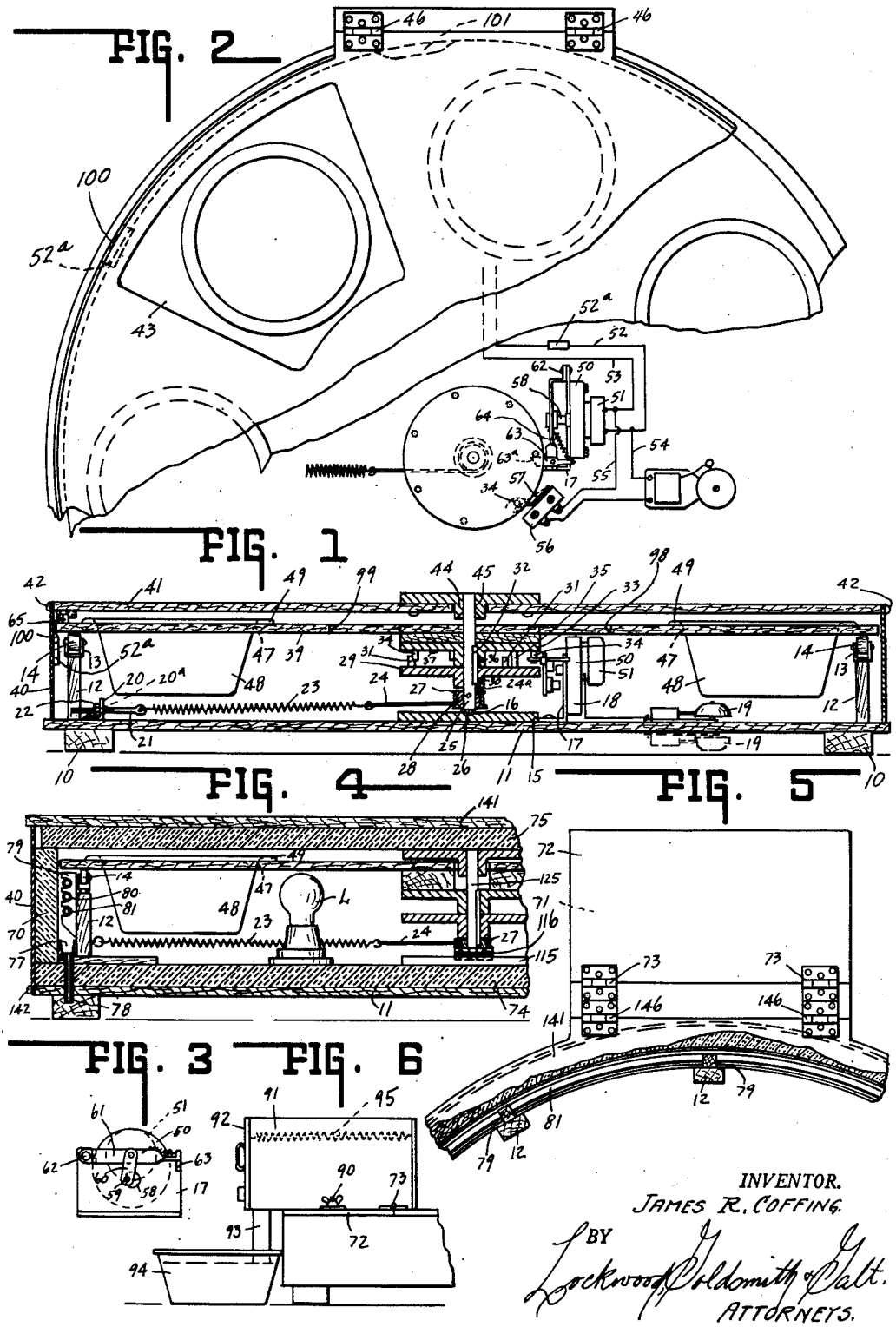
INVENTOR.
JAMES R. COFFING.
BY Lockwood, Goldsmith & Galt
ATTORNEYS.

Patented Nov. 7, 1950

2,528,742

UNITED STATES PATENT OFFICE 2,528,742

PET FEEDER

James R. Coffing, Danville, Ill.

Application June 17, 1949, Serial No. 99,682

13 Claims. (Cl. 161—10)

This invention relates to a pet feeder device.

The chief object of this invention is to provide a device of the character indicated which will intermittently and successively expose compartments containing food, etc., at predetermined intervals such as once or twice a day and for several days, say, over a period of a week.

The chief feature of the present invention resides in powering a rotatable table member for rotation, holding said member against rotation until a predetermined interval has elapsed, then releasing the member for limited rotation only, and repeating the aforesaid as often as desired or required.

Another feature of the invention resides in the provision of alarm means which is actuable only when the table member is moved which serves to call the pet to the feeder for eating the food or drinking the liquid provided.

A further feature of the invention resides in the provision of a wet feed supply and its control as well as the means for preventing freezing and bacterial growth.

Other objects and features of the invention will be set forth more fully hereinafter.

The full nature of the invention will be understood from the accompanying drawings and the following description and claims:

In the drawings,

Fig. 1 is a longitudinal sectional view through a dry food type feeder embodying the invention.

Fig. 2 is a partial top plan thereof, successive layers or parts being broken away to show other parts in detail.

Fig. 3 is a side elevation of one form of escapement mechanism.

Fig. 4 is a view similar to Fig. 1 of a modified form of the invention utilized for wet feed, only one half being illustrated.

Fig. 5 is a top plan of such modification, or rather a portion thereof, certain parts being broken away to show other parts in detail.

Fig. 6 is a side elevation of a water supply addition that may be provided when desired.

In Fig. 1 of the drawings, 10 indicates support or spacer elements to which is suitably secured the base 11 from which at spaced intervals there projects upwardly the brackets or standards 12 terminating in yokes 13 mounting load bearing and table stabilizing rollers 14.

Base 11 may be of plywood and centrally mounts bearing plate 15 having conical central bearing seat 16 to which reference will be had later. Also carried by the base 11 is the bracket 17 which rigidly supports an escapement mechanism 18 to which reference will be had later. Base 11 also may mount the bell alarm 19 upon the upper side as shown in full lines, see Fig. 1, or in depending relation as shown by dotted lines in the same figure.

Base 11 supports bracket 20 which is apertured at 20ª to take an eye-bolt 21 mounting lock nut 22. One end of coiled tension spring 23 is secured to the eye of said bolt 21 and the other end is secured to one end of cable 24.

A vertical shaft 25 includes a conical end 26 disposed in seat 16. Pinned as at 28 or otherwise secured to shaft 25 is the drum 27 upon which the cable 24 is wound and from which it is unwound when released to spring 23. The end of the cable is anchored to the drum as at 24ª.

Mounted upon the shaft 25 is disc 29 secured by set screw 30. Upon said disc are the pins 31 disposed in proper spaced relation. Key 32 may also be employed.

Also mounted upon said shaft 25 is a disc 33 secured thereto by set screws 36. Key 32 may be utilized therewith. Depending from said disc 33 and directed toward disc 29 are the spaced stop pins 34 and the long stop pin, or 7-day pin, 35.

The escapement mechanism moves from a pin on plate 29 to a pin on plate 33 in the case of either once a day feeding or twice a day feeding for the cam reverses and escapement trigger moves correspondingly from plate 33 to plate 29. There are four pins on plate 33 and three pins on 29 for once a day feeding; or seven pins on 33 and seven pins on 29 for twice a day feeding.

Carried by plate 33 as at 37 is spacer 38 and carried thereby is the table element 39, both being apertured to pass shaft 25. The housing comprises the side wall 40 secured at its upper edge to top or cover 41 as at 42 and having feeding opening 43, see Fig. 2. Rigid with the cover is flanged bushing 44 having bearing portion 45 to take the top of shaft 25 and rotatably center same.

The aforesaid housing may be hinged to the base as at 46, see Fig. 2. Also note the table 39 rotates upon rollers 14 if there be a tendency toward unbalance as will be obvious from further description. The table 39 includes seven holes 47 for daily feedings or fourteen holes, not shown. Seated in each hole is a flanged pan 48, the flange 49 resting upon the table.

Reference will now be had to Figs. 1 to 3 inclusive. Bracket 17, carried by the base 11 mounts a reducing unit 50 driven by synchronous motor 51 supplied with energy by lines 52 and 53 as shown. Branches 54 and 55 lead to alarm (bell) 19.

Line 55 includes a micro-switch biased to closed circuit position and included in a housing 56 mounting switch actuator 57 disposed in the path of pins 31 and 34 as shown in Fig. 1. When not pin engaged the actuator moves to the dotted line position permitting the switch to close and the bell to ring. This only occurs while table 39 indexes.

The reducer shaft 58 mounts eccentric pin 59, see Fig. 3, that is pivotally connected to one end of link 60 pivoted at its other end to a lever 61. This lever at one end is pivoted at 62 upon bracket 17 and at its other end mounts escapement pawl 63 which is normally biased by spring 64 to transverse position, see Fig. 2. The back face 63a is biased to pass the pins in one direction of pin rotation that is for resetting purposes.

Spring 64 normally holds pawl 63 in the pin engaging position. As the eccentric pin rotates once in twenty-four hours when the pin is lowermost it disposes pawl 63 below the end of the pin 34. Then pin 34 rides over the pawl and spring 23 through cable 24 indexes the table one division of travel.

Bottom disc 29 and top disc 33 are always used. Pawl 63 moves from low position to high position to disengage pin 31 and will be obstructed thereby from passing pin 34. The cam then rotates from top to bottom to permit the pawl to disengage pin 34 and be again obstructed by pin next in line on disc 29 whether there be seven or fourteen pins.

Of course, the table for twice daily feeding would have fourteen holes and the cover opening 42 would be half the size illustrated. After the seven-day interval has elapsed the table is reversely rotated manually to reset the table in starting position, repower spring 23 and synchronize the aforesaid with the escape mechanism. The stop 65, see Fig. 1, prevents oversetting and thus maintains proper timing.

Reference will now be had to Figs. 4 and 5. Herein there is shown insulation 70 carried by side wall 40 which herein is secured to base 11 at 142. In this instance cover plate 141 is hinged at 146. Associated with this structure is a compartment 71 having cover 72 hinged as at 73. Therein is mounted a hermetically sealed condensing refrigeration unit that maintains in the housing any desired temperature by means of a thermostat, not shown, and as for example this unit cuts in at 55° F. and cuts off at 50° F. so that a range of 50°-55° F. is maintained, or lower if it would seem advisable.

Since the indexing mechanism has been fully illustrated and described previously, same is omitted herefrom for sake of brevity. The table element 39 as before is apertured to accommodate flanged food pan 48. This table again is rotatably supported upon rollers 14 carried by standard 12.

Herein above base 11 and supported thereby is cork sheet insulation 74 upon which is mounted plate 115 provided with thrust bearing 116 associated with shaft 125. Shaft 125 carried drum 27 which is associated with cable 24 connected to power spring 23.

The cover 141 has secured to it a depending layer of cork or like insulation 75. Within the side wall insulation 70 and exteriorly of standards 12 is the peripheral collection channel 77 having a defrost drain tube 78. Carried by each standard 12 is a rack 79 notched at 80 to seat the evaporator cooling coil 81. Fig. 5 shows this multiple turn enveloping coil and the several racks, standards and rollers aforesaid.

Since the present modification is intended for wet feed the coil insures cooling of the wet feed to a bacteria growth inhibiting temperature but the control specified prevents freezing of the feed. To insure a non-chilled temperature of the food exposed by the opening in the cover, not shown, there is provided a 75-watt or so bacteria killing and heating light bulb L. This is connected in multiple with the motor circuit aforesaid and the branch includes therein a thermostatically controlled switch, not shown, which cuts in the lamp when the temperature drops too low and cuts out the lamp when the temperature gets too high. These limits may be 40° F. and 45° F., respectively, if desired.

Reference will now be had to Fig. 6 wherein there is illustrated a water supply device. Herein there is detachably secured as at 90 to the top of compartment cover 72 a water container 91 having leak-proof mounted cover 92. A side tube 93 extends downwardly and terminates in a water pan 94. Air displacement level control for supplying water from container 91 to pan 94 is provided as needed.

The pan is preferably suitably but detachably anchored in place to prevent container discharge other than to the pan. To prevent water freezing a resistance type heater 95 is provided. It also is connected in multiple with the motor circuit. The heater branch circuit is thermostatically controlled, cutting in and out with the light bulb within the heater housing.

Note that when the cover is raised all pans are simultaneously exposed for removal, cleaning, sterilization and refilling purposes and no part of the contents can drop below the table no matter how messy the animal be in its feeding. Also note that the table includes a hole 98 for motor adjustment in resetting and opposite thereto is a balancing hole 99.

Of course, the wet feed feeder can handle satisfactorily dry feed. In such cases the refrigeration unit power connections and lamp connections would be interrupted by setting freeze prevention thermostat to 30° and overheating prevention thermostat to 70° thus rendering both temporarily inoperative except in extreme temperatures.

A supply line such as line 52 may include a switch 52a therein which normally is closed until the table has effected its complete traverse. At such time switch 52a is permitted to open thus opening all circuits. Such switch 52a is illustrated in Fig. 2 and includes table follower 100. Table 39 includes cutout 101 in its periphery. Thus, when the follower, under constraint registers with the notch 101 switch 52a opens and all electrical connections or circuits are opened. Obviously, when the table 39 is reversely rotated for reset purposes switch 52a is closed and remains closed until notch 101 again registers follower 100. This will result in a complete and automatic defrosting of expansion coils each seventh day.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a pet feeder having an enveloping housing with a feeding opening in the top thereof and a rotatable support within the same and intermittently indexable, the combination of a plurality of feeding containers carried by the support and successively exposed by the opening upon progressive indexing of the support, means normally constraining the support for rotation, stop means limiting such rotation to an indexing amount, and time controlled means intermittently releasing said stop means for such indexing.

2. A pet feeder as defined by claim 1 wherein there is rotatable with the support, spaced stop members successively associated with said stop means.

3. A pet feeder as defined by claim 1 wherein there is rotatable with the support, spaced stop members successively associated with said stop means, and a final stop member preventing further indexing.

4. A pet feeder as defined by claim 1 wherein there is rotatable with the support, spaced stop members successively associated with said stop means, and a final stop member preventing further indexing, the rotation constraining means being of resetting character, the stop means ratcheting relative to the stop members in the resetting operation.

5. A pet feeder as defined by claim 1 wherein there is rotatable with the support, spaced stop members successively associated with said stop means, and spaced stop members intermediately disposed relative to the first mentioned spaced stop members and in confronting relation thereto, the said stop means being alternately associated with the stop members of both spaced member groups.

6. A pet feeder as defined by claim 1 wherein there is rotatable with the support, spaced stop members successively associated with said stop means, and spaced stop members intermediately disposed relative to the first mentioned spaced stop members and in confronting relation thereto, the said stop means being alternately associated with the stop members of both spaced member groups, and a final stop member preventing further indexing.

7. A pet feeder as defined by claim 1 wherein there is rotatable with the support, spaced stop members successively associated with said stop means, and spaced stop members intermediately disposed relative to the first mentioned spaced stop members and in confronting relation thereto, the said stop means being alternately associated with the stop members of both spaced member groups, and a final stop member preventing further indexing, the rotation constraining means being of resetting character, the stop means ratcheting relative to the stop members in the resetting operation.

8. A pet feeder as defined by claim 1 wherein there is provided an audible alarm, and means only operable in the indexing of the support for alarm actuation.

9. A pet feeder as defined by claim 1 wherein the housing is of heat insulation type, and within the same and about the path of travel of said support is disposed cooling coil means for maintaining food in edible condition.

10. A pet feeder as defined by claim 1 wherein the housing is of heat insulation type, and within the same and about the path of travel of said support is disposed cooling coil means for maintaining food in edible condition, and condensate drain collection means disposed beneath the cooling coil means.

11. A pet feeder as defined by claim 1 wherein the housing is of heat insulation type, and within the same and about the path of travel of said support is disposed cooling coil means for maintaining food in edible condition, and light means juxtapositioned to the feeding opening for food warming and other purposes as described.

12. A pet feeder as defined by claim 1 wherein the housing is of heat insulation type, and within the same and about the path of travel of said support is disposed cooling coil means for maintaining food in edible condition, and condensate drain collection means disposed beneath the cooling coil means, and light means juxtapositioned to the feeding opening for food warming and other purposes as described.

13. A pet feeder as defined by claim 1 wherein there is provided a watering pan juxtapositioned to said housing, a water container rigid therewith and being gravity discharge controlled for maintaining predetermined water level in the pan, and heating means in said container for preventing water freezing therein.

JAMES R. COFFING.

REFERENCES CITED

The following references are of record in the file of this patent:

UNITED STATES PATENTS

| Number | Name | Date |
| --- | --- | --- |
| 1,989,298 | Tingley | Jan. 29, 1935 |
| 2,157,682 | Sweeny | May 9, 1939 |
| 2,189,213 | MacDonell | Feb. 6, 1940 |
| 2,500,243 | Dixon | Mar. 14, 1950 |